US008149729B2

(12) United States Patent
Li et al.

(10) Patent No.: US 8,149,729 B2
(45) Date of Patent: Apr. 3, 2012

(54) METHODS TO DETECT WIRELESS STATIONS IN A WIRELESS LOCAL AREA NETWORK

(75) Inventors: Yalun Li, Fremont, CA (US); Chen Wang, San Jose, CA (US); Terrin Eager, Campbell, CA (US)

(73) Assignee: AirMagnet, Inc., Sunnyvale, CA (US)

( * ) Notice: Subject to any disclaimer, the term of this patent is extended or adjusted under 35 U.S.C. 154(b) by 392 days.

(21) Appl. No.: 12/552,230

(22) Filed: Sep. 1, 2009

(65) Prior Publication Data
US 2009/0316605 A1    Dec. 24, 2009

Related U.S. Application Data

(62) Division of application No. 11/796,335, filed on Apr. 26, 2007, now Pat. No. 7,616,586.

(51) Int. Cl.
H04L 12/28 (2006.01)
(52) U.S. Cl. ........................ 370/252; 370/338
(58) Field of Classification Search .............. 370/252, 370/338, 352, 329, 242, 244, 245, 253
See application file for complete search history.

(56) References Cited

U.S. PATENT DOCUMENTS

| | | | |
|---|---|---|---|
| 7,221,927 B2* | 5/2007 | Kolar et al. | 455/403 |
| 7,233,602 B2 | 6/2007 | Chen et al. | |
| 7,336,670 B1* | 2/2008 | Calhoun et al. | 370/401 |
| 7,990,883 B2* | 8/2011 | Nishikawa | 370/252 |
| 8,040,837 B2* | 10/2011 | Urabe et al. | 370/328 |
| 2003/0235208 A1 | 12/2003 | Sahinoglu | |
| 2005/0111487 A1 | 5/2005 | Matta et al. | |
| 2005/0268181 A1 | 12/2005 | Murty et al. | |
| 2006/0029096 A1 | 2/2006 | Babbar et al. | |
| 2006/0126577 A1* | 6/2006 | Yano et al. | 370/337 |
| 2006/0200845 A1 | 9/2006 | Foster et al. | |
| 2006/0280205 A1 | 12/2006 | Cho | |
| 2007/0242702 A1 | 10/2007 | Shim | |
| 2007/0258383 A1 | 11/2007 | Wada | |
| 2008/0066113 A1 | 3/2008 | Skelly | |

OTHER PUBLICATIONS

PCT ISR dated Sep. 19, 2008, for PCT/US07/10502, filed Apr. 30, 2007, 5 pages.
Written Opinion of the International Searching Authority dated Sep. 19, 2008, for PCT/US07/10502, filed Apr. 30, 2007, 4 pages.
Chinese Office Action for corresponding Chinese Patent Application No. 200780022152.X, dated Jun. 9, 2010, 5 pgs.

* cited by examiner

*Primary Examiner* — Brian Nguyen
(74) *Attorney, Agent, or Firm* — Blakely, Sokoloff, Taylor & Zafman LLP

(57) ABSTRACT

In one exemplary embodiment, a process for detecting a phone includes monitoring wirelessly transmitted traffic between first and second stations. Next, the process determines whether the traffic sent in both directions between the first and second stations are close to each other in term of traffic volume. The process identifies a total frames count of a number of frames of an identical frame size transmitted, where the number of frames is greater than any number of frames of a same size. The process calculates the percentage of the count that was just collected out of the count of the total frames. The process identifies the first station as a phone if the calculated percentage is over a first threshold and the total frames count is over a second threshold.

20 Claims, 16 Drawing Sheets

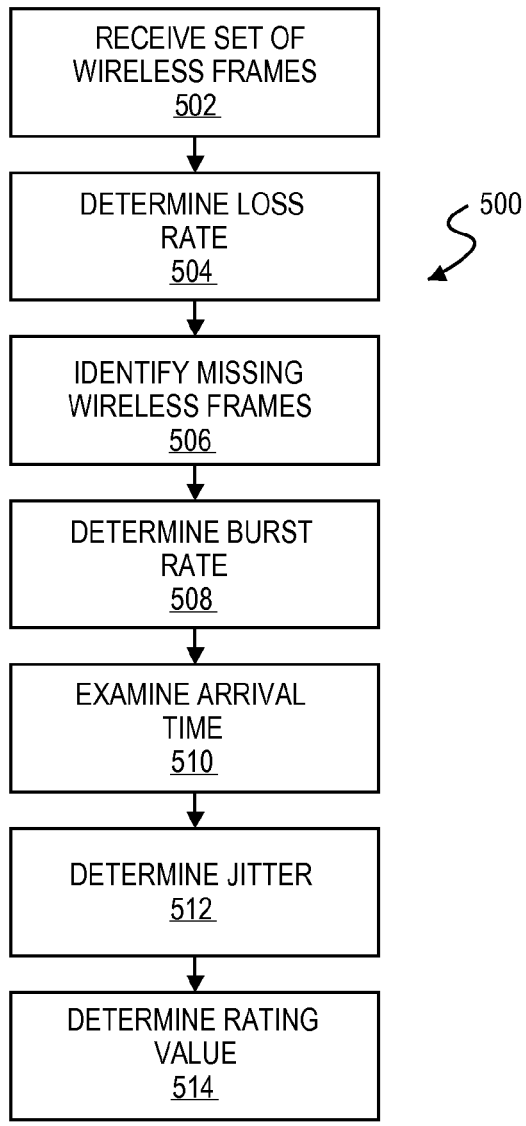
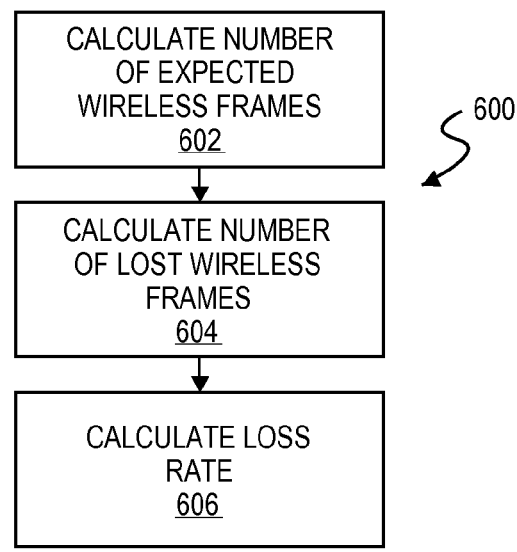
FIG. 5
FIG. 6

| R Value | MOS Score |
|---|---|
| 40 | 2.06 |
| 50 | 2.57 |
| 60 | 3.09 |
| 70 | 3.59 |
| 80 | 4.02 |
| 90 | 4.33 |

FIG. 12

METHODS TO DETECT WIRELESS STATIONS IN A WIRELESS LOCAL AREA NETWORK

BACKGROUND

1. Field

The present application relates to wireless local area networks, and, more particularly, to auto-detecting one or more wireless stations in a wireless local area network.

2. Description of the Related Art

Traditionally, the public switched telephone network (PSTN) has been used for telecommunications. In general, users place calls on the PSTN using a telephone that establishes an electrical connection with a local telephone office (a central office). The central office responds with a dial tone. The user then dials a telephone number identifying the destination of the call. A network of switching systems then connects the call between the caller and the destination.

In conventional telephony, voice quality is typically measured by the Mean Opinion Score (MOS score) standardized by the International Telecommunications Union (ITU). The MOS score is subjectively determined by the customer user experience and is defined in the ITU-T Recommendation G.107. The MOS score has a range of 0-5, with 4.5 generally considered a good quality voice sound.

The MOS score is related to an objective Rating Value (R-Value), which combines various transmission parameters relevant for the considered connection. The R-Value can be determined by analyzing the received voice data for a variety of parameters, such as latency, time delay, jitter, variation in the time delay, burst rate, loss rate, etc. The R-Value has a range of 0-100, with 90 considered a good quality voice signal. The ITU standardized equation for the R-Value is:

$$R = R_0 - I_s - I_d - I_{e\text{-}eff} + A.$$

$R_0$ is the signal-to-noise ratio. $I_s$ is the signal impairment. $I_d$ is the delay impairments. $I_{e\text{-}eff}$ is the effective equipment impairment. A is the advantage factor.

A recent advancement of telephony is the development VoIP. In VoIP, calls are carried on computer networks in addition to or instead of on the PSTN. The analog voice signals are converted to digital signals in data clusters called wireless frames. The wireless frames contain information as to where the data should be delivered. Instead of a telephone number, the voice data is sent to a specific IP address.

VoIP can be implemented on a wired local area network and/or a wireless local area network. When VoIP is implemented on a wired local area network, voice quality can be measured by examining the frames that carry the VoIP data. In particular, an R-Value is typically determined by examining the Real-time Transport Protocol (RTP) fields in the frames. However, when VoIP is implemented on a wireless local area network, particularly one operating in accordance with the IEEE 802.11 standard, an R-Value cannot be determined by examining the RTP field in the wireless frames because, except for header information, the wireless frames are encrypted.

SUMMARY

In one exemplary embodiment, a process for detecting a phone includes monitoring wirelessly transmitted traffic between first and second stations. Next, the process determines whether the traffic sent in both directions between the first and second stations are close to each other in term of traffic volume. The process identifies a total frames count of a number of frames of an identical frame size transmitted, where the number of frames is greater than any number of frames of a same size. The process calculates the percentage of the count that was just collected out of the count of the total frames. The process identifies the first station as a phone if the calculated percentage is over a first threshold and the total frames count is over a second threshold.

DESCRIPTION OF THE FIGURES

FIG. 5 depicts an exemplary process of measuring voice quality in VoIP in a WLAN;

FIG. 6 depicts an exemplary process of determining loss rate;

FIG. 12 depicts a table of R-Values and corresponding MOS scores;

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
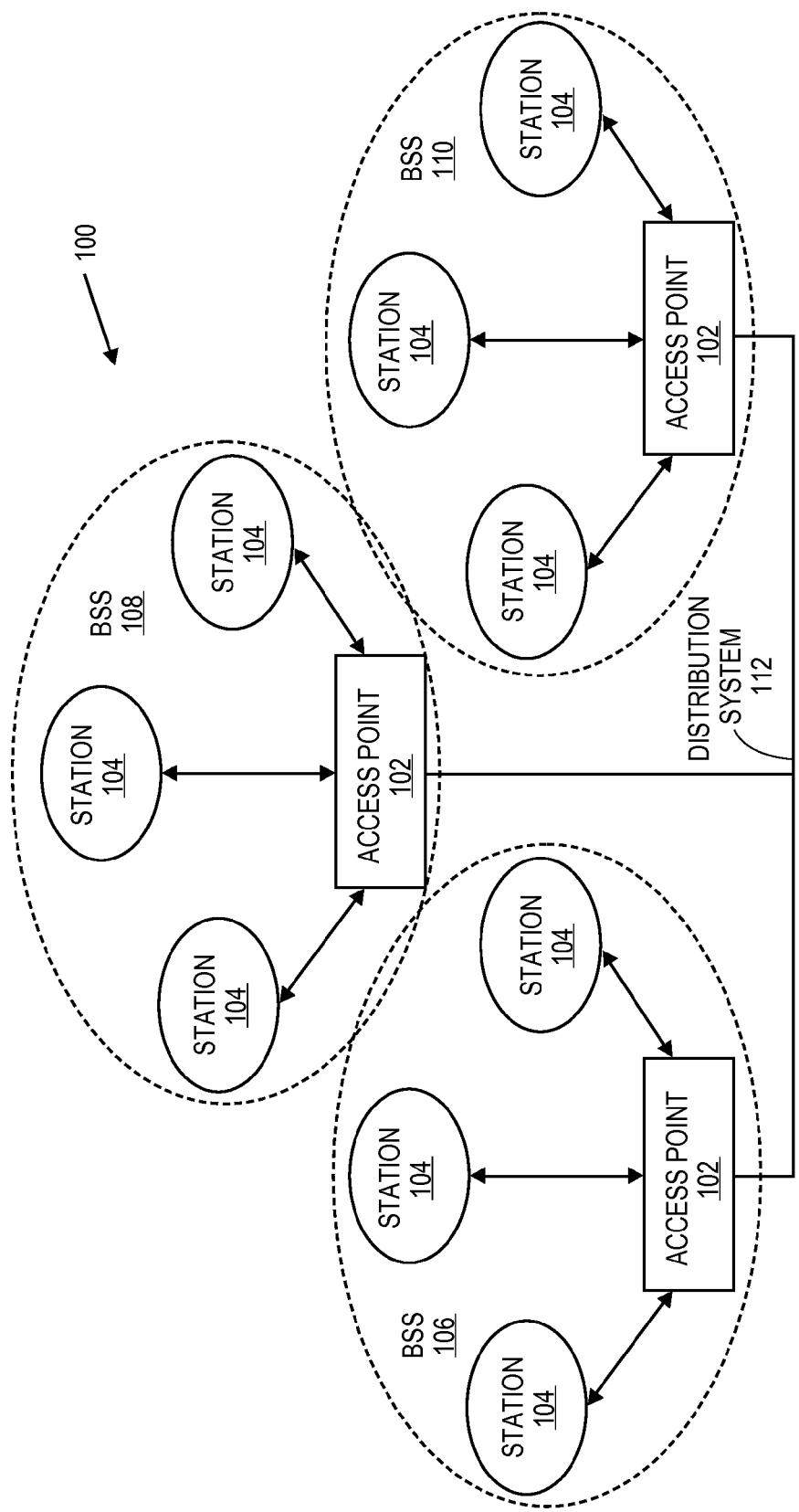
FIG. 1 depicts an exemplary extended service set in a wireless local area network (WLAN)

With reference to FIG. 1, an exemplary extended service set 100, which forms a wireless local area network (WLAN) operating according to the IEEE 802.11 standard, is depicted having basic service sets ("BSS") 106, 108, and 110. Each BSS can include an access point ("AP") 102 and stations 104 with VoIP capability. Although FIG. 1 depicts an extended service set 100 having three BSSs 106, 108, and 110, each of which include three stations 104, it should be recognized that an extended service set 100 can include any number of BSSs 106, 108, and 110, which can include any number of stations 104.

A station 104 is a device that can be used to connect to the WLAN, which can be mobile, portable, stationary, and the like, and can be referred to as the network adapter or network interface card. For instance, a station 104 can be a laptop computer, a personal digital assistant, a mobile telephone, and the like. In addition, a station 104 can support station services, such as authentication, deauthentication, privacy, delivery of data, and the like.

Each station 104 can communicate directly with an AP 102 through an air link, such as by sending a radio or infrared signal between WLAN transmitters and receivers. For example, with reference to FIG. 2, station 104 and AP 102 are depicted as having transmission ranges 204 and 202, respectively. Thus, when transmission ranges 204 and 202 overlap, station 104 and AP 102 can communicate by sending frames over an air link.

With reference again to FIG. 1, each AP 102 can support station services, as described above, and can additionally support distribution services, such as association, disassociation, distribution, integration, and the like. Accordingly, an AP 102 can communicate with stations 104 within its BSS 106, 108, and 110, and with other APs 102 through medium 112, called a distribution system, which forms the backbone of the WLAN. This distribution system 112 can include both wireless and wired connections.

Under the current IEEE 802.11 standard, each station 104 must be authenticated to and associated with an AP 102 in order to become a part of a BSS 106, 108, or 110. One station 104 can be authenticated to different APs 102 simultaneously, but can only be associated with one AP 102 at any time.

Once a station 104 is authenticated to and associated with an AP 102, the station 104 can communicate with another station 104 in the WLAN. In particular, a station 104 can send a frame having a source address, a basic service set identification address ("BSSID"), and a destination address, to its associated AP 102. The AP 102 can then distribute the frame to the station 104 specified as the destination address in the frame. This destination address can specify a station 104 in the same BSS 106, 108, or 110, or in another BSS 106, 108, or 110 that is linked to the AP 102 through distribution system 112. It should also be recognized that station 104 can communicate with devices in a wired network that is linked to AP 102 through distribution system 112.

As noted earlier, VoIP can be implemented on a WLAN operating in accordance with the IEEE 802.11 standard. The voice data is carried in wireless frames transmitted in the WLAN. For example, with reference again to FIG. 2, station 104 can be a device with VoIP capability. Thus, the wireless frames transmitted to and from station 104 can contain voice data. In particular, in conducting VoIP, station 104 can digitize speech into VoIP data, then transmit the VoIP data in wireless frames to AP 102. Station 104 can also receive VoIP data in wireless frames sent by AP 102 (the wireless frames having been sent to AP 102 by another device), then decode the VoIP from the wireless frames to produce speech.

As also noted above, when VoIP is implemented on a wired network, an R-value can be determined by examining the RTP fields in the frames carrying VoIP data. However, when VoIP is implemented on a wireless local area network, particularly one operating in accordance with the IEEE 802.11 standard, an R-Value cannot be determined by examining the RTP fields in the wireless frames because, except for header information, the wireless frames are encrypted.

Figure 3:
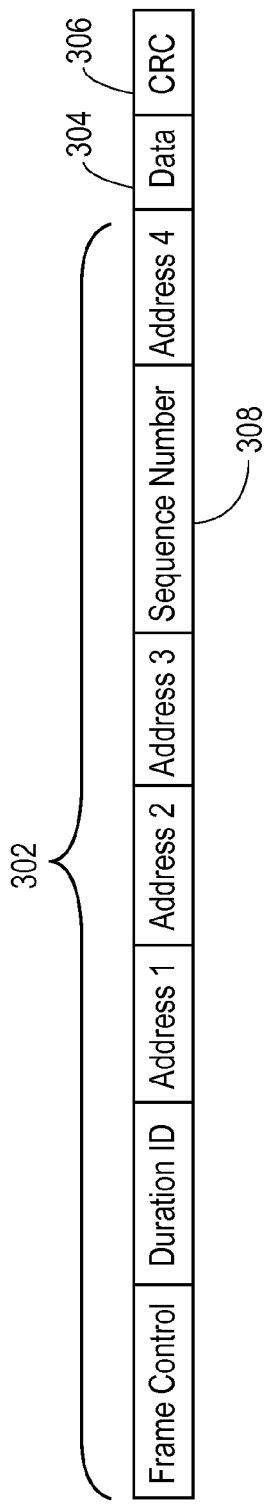
FIG. 3 depicts an exemplary frame format.

In particular, with reference to FIG. 3, an exemplary wireless frame 300 in a WLAN operating in accordance with the IEEE 802.11 standard includes a Medium Access Control (MAC) header portion 302, a data portion 304, and a cyclic redundancy check (CRC) portion 306. As depicted in FIG. 3, MAC header portion 302 includes a frame control field, a duration ID field, destination address fields, and a sequence number 308. RTP, Remote Call Procedure (RCP), User Datagram Protocol (UDP), and the actual voice data are contained in data portion 304, which is encrypted.

Figure 2:
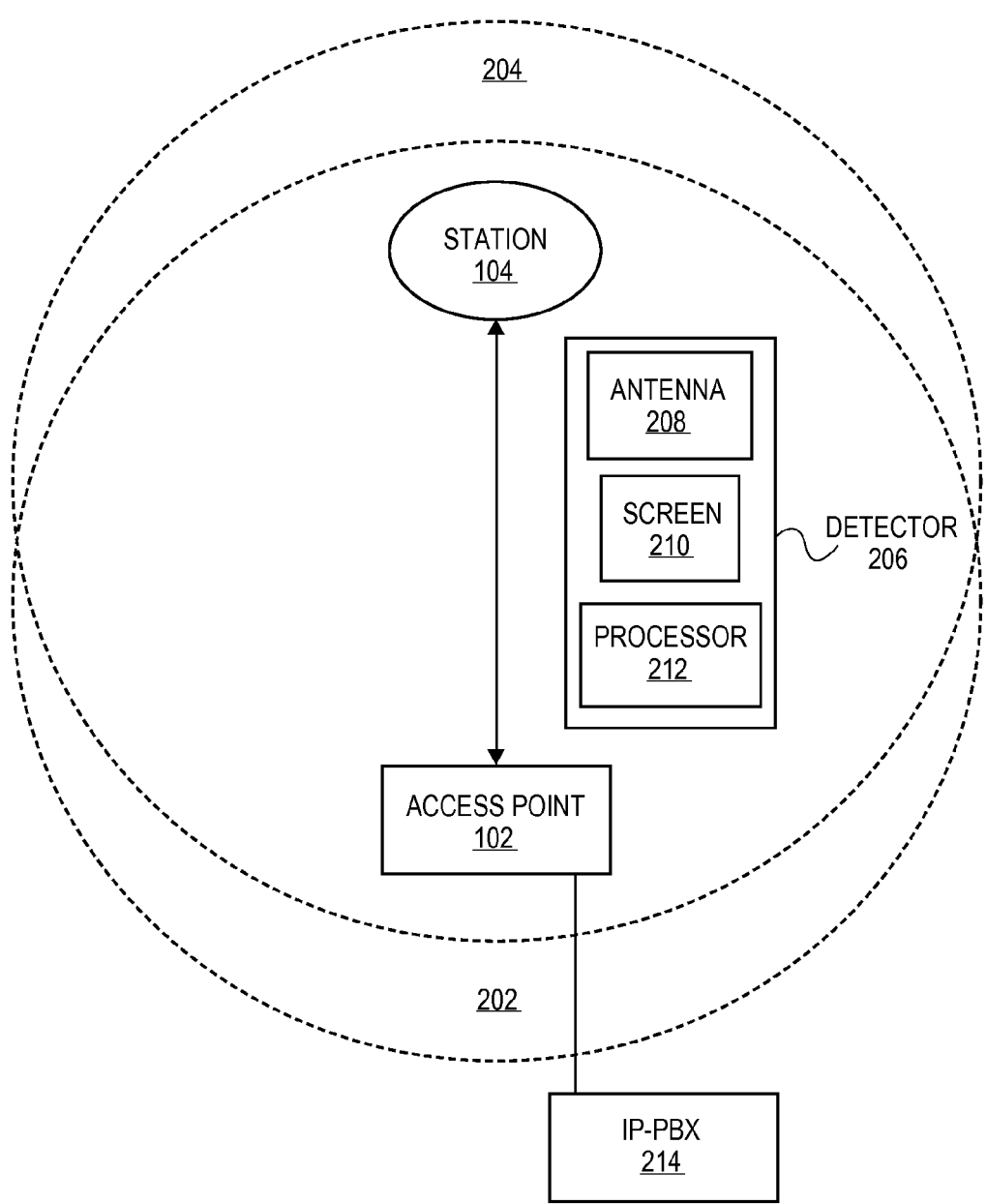
FIG. 2 depicts an exemplary embodiment of a device associated with an AP and a detector located within transmission range of the device and the AP.

Thus, with reference again to FIG. 2, in one exemplary embodiment, a detector 206 is used to receive a set of wireless frames 402 transmitted between two wireless devices, such as AP 102 and station 104. In the present exemplary embodiment, station 104 is associated with AP 102, and detector 206 is located within transmission ranges 204 and 202 of station 104 and AP 102. Although set of wireless frames 402 is depicted in FIG. 2 as being transmitted from AP 102 to station 104, it should be recognized that set of wireless frames 402 can be transmitted from station 104 to AP 102.

In the present exemplary embodiment, an R-Value is determined based on the set of wireless frames 402 received by detector 206. In particular, with reference to FIG. 5, an exemplary process 500 is depicted of determining an R-Value based on the set of wireless frames. The process is performed by processing logic that may comprise hardware (circuitry, dedicated logic, etc.), software (such as is run on a general purpose computer system or a dedicated machine), or a combination of both.

Referring to FIG. 5, in processing block 502, a set of wireless frames transmitted between the station and the access point during a predetermined time period is received by the detector. As noted above, the wireless frames in the set carry VoIP data. Then, processing logic examines the arrival times (processing block 504). In processing block 506, missing wireless frames in the set are identified. Frames may be identified as missed if the arrival time is not when it was expected.

In processing block 508, a loss rate is determined based on the number of wireless frames which arrive at the expected time in the set and an expected number of wireless frames during the predetermined time period. In processing block 510, a burst rate is determined based on the identification of missing wireless frames in the set. In processing block 514, a rating value indicative of voice quality is determined based on the loss rate and burst rate.

As depicted in FIG. 2, detector 206 can include an antenna 208, a screen 210, and a processor 212. Antenna 208 can be used to receive the set of wireless frames transmitted between station 104 and AP 102. Screen 210 can be used to display information, such as the determined R-Value, to a user. Processor 212 can be used to perform the steps of process 500 (FIG. 5).

Although detector 206 is depicted in FIG. 2 as an integrated device, it should be recognized that antenna 208, screen 210, and processor 212 can be located in multiple devices and multiple locations. For example, antenna 208 can be located in detector 206 to receive frames transmitted between station 104 and AP 102, but screen 210 and processor 212 can be located in a separate workstation that communicates with detector 206 through either a wired or wireless connection.

1. Determining Loss Rate

As described above, in one exemplary embodiment, an R-Value is determined based, in part, on a loss rate determined based on a set of wireless frames received during a predetermined time period. With reference to FIG. 6, an exemplary process 600 is depicted of determining the loss rate based on the set of wireless frames received during the predetermined time period. The process is performed by processing logic that may comprise hardware (circuitry, dedicated logic, etc.), software (such as is run on a general purpose computer system or a dedicated machine), or a combination of both.

Referring to FIG. 6, in processing block 602, an expected number of wireless frames during the predetermined time period is calculated by dividing the predetermined time period by an expected inter-frame interval. In one embodiment, the expected inter-frame interval for VoIP is 20 milliseconds. For example, assume that the predetermined time interval is 200 milliseconds. Thus, in the present example, the expected number of wireless frames during the predetermined time period is 10 (i.e., 200 milliseconds/20 milliseconds). It should be recognized, however, that the expected inter-frame interval for VoIP may be changed to other than 20 ms (e.g., 2 ms, 3 ms, 5 ms, etc.) This may be based in the codec being used.

With reference again to FIG. 6, in processing block 604, a number of lost wireless frames is calculated as the difference between the expected number of wireless frames and the actual number of wireless frames in the set of wireless frames received during the predetermined time period. In the present example, with reference to FIG. 4, assume that only 6 wireless frames arrived at the expected time, which are in the set of wireless frames received during the predetermined time period of 200 milliseconds. Thus, in this example, the number of lost wireless frames is 4 (i.e., 10 wireless frames−6 wireless frames).

With reference again to FIG. 6, in processing block 606, the loss rate is calculated as a ratio of the number of lost wireless frames to the expected number of wireless frames. In the present example, the loss rate is 0.4 (i.e., 4 wireless frames/10 wireless frames).

2. Determining Burst Rate

As described above, in one exemplary embodiment, an R-Value is determined based, in part, on a burst rate. In particular, in the present exemplary embodiment, the burst rate is determined based on a state transition probability defined as:

$$BurstRate = \frac{1}{p+q}.$$

p is the probability that a wireless frame goes from a found to lost state. q is the probability that a wireless frame goes from a lost to found state.

Figure 7:
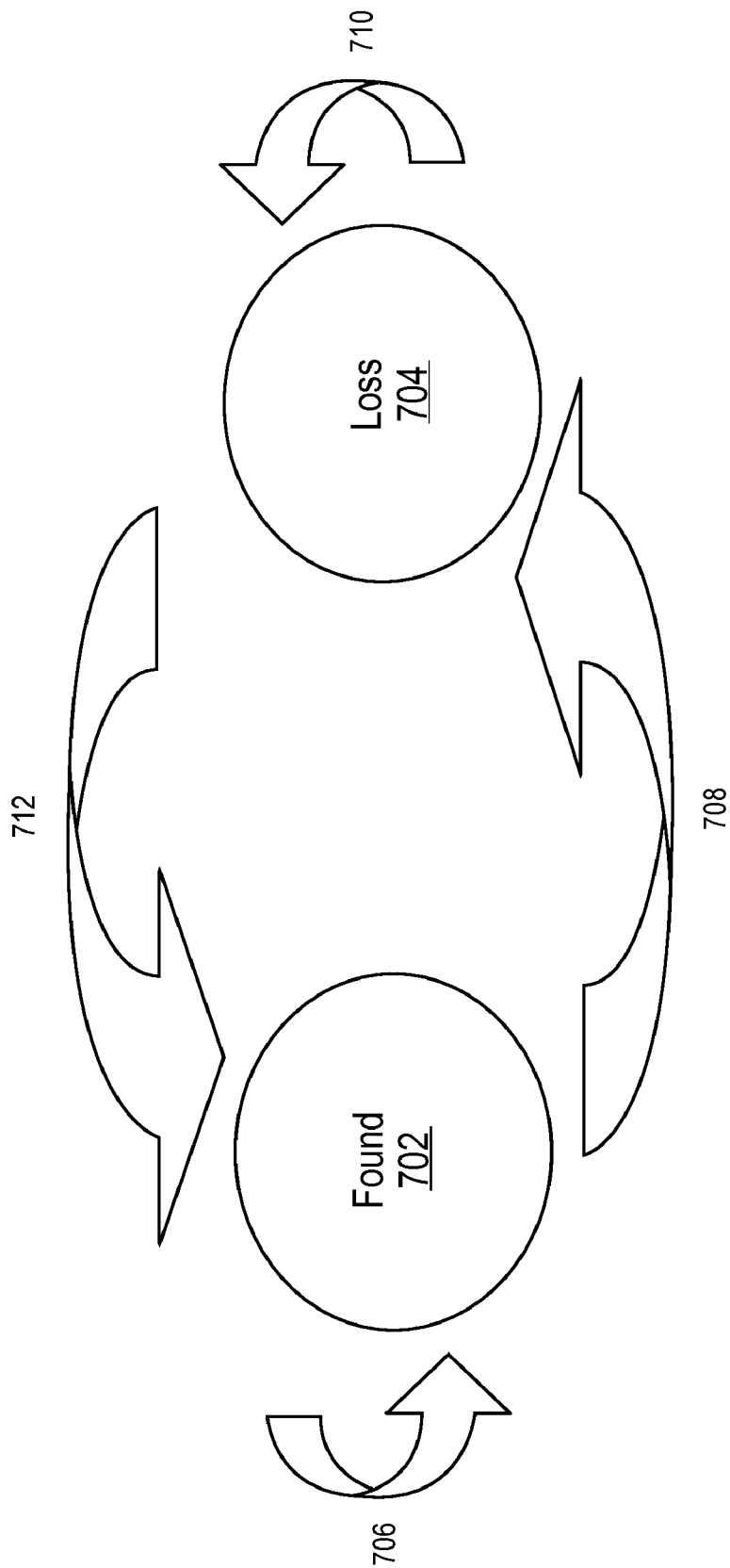
FIG. 7 depicts an exemplary state diagram of wireless frames.

FIG. 7 depicts a state diagram having a found state 702, lost state 704, found-to-found state 706, found-to-lost state 708, lost-to-lost state 710, and lost-to-found state 712. As noted above, p is the probability of a wireless frame being in the found-to-lost state 708. In the present exemplary embodiment, p is calculated by dividing the number of wireless frames in the found-to-lost state 708 by the total number of wireless frames originating from the found state 702. As also noted above, q is the probability of a wireless frame being in lost-to-found state 712. In the present exemplary embodiment, q is calculated by dividing the number of wireless frames in lost-to-found state 712 by the total number of wireless frames originating from lost state 704.

A. Identifying Missing Wireless Frames Based on Arrival Times

Figure 8:
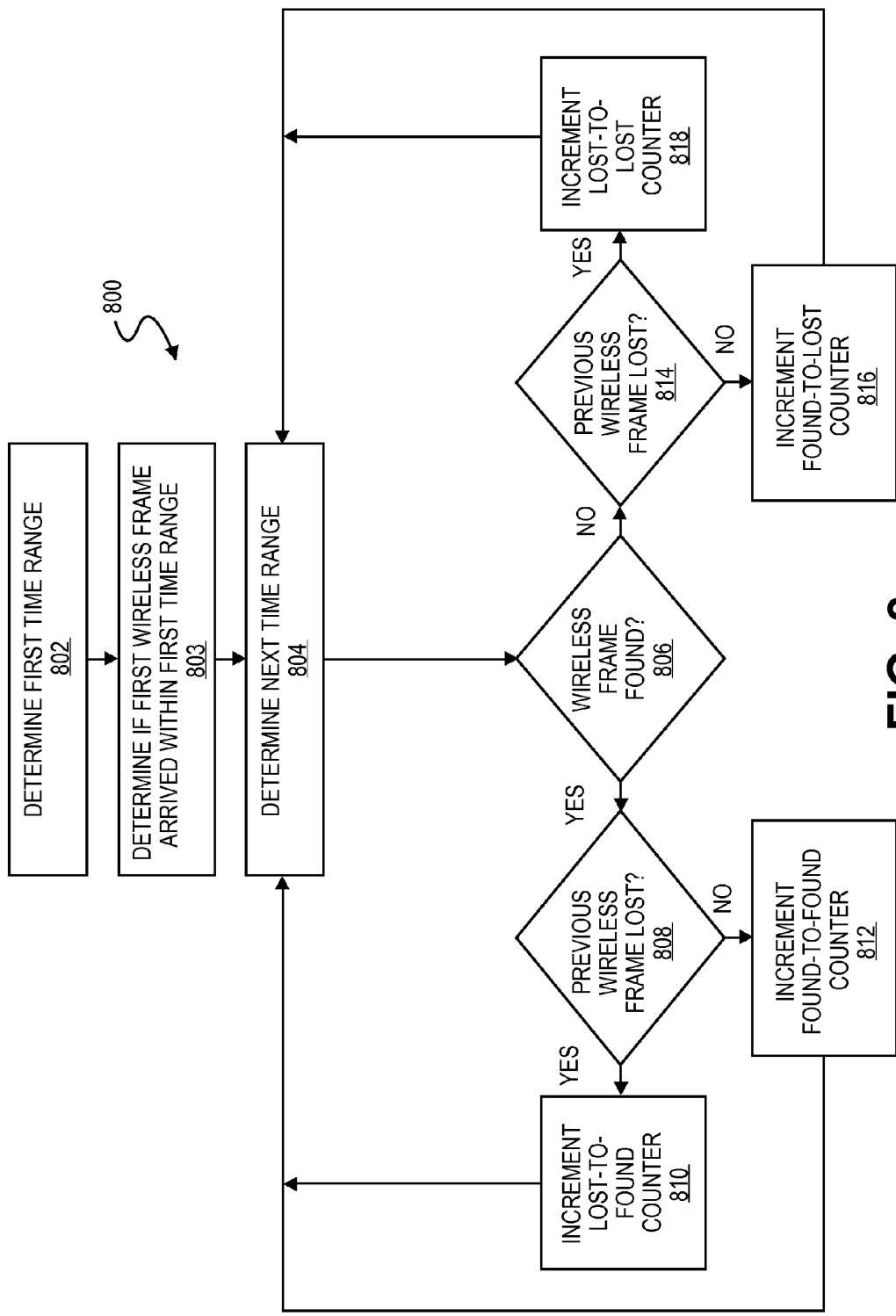
FIG. 8 depicts an exemplary process of determining burst rate.

With reference to FIG. 8, an exemplary process 800 is depicted of determining the burst rate by identifying missing wireless frames based on arrival times of the wireless frames in the set of wireless frames received during the predetermined time period. The process is performed by processing logic that may comprise hardware (circuitry, dedicated logic, etc.), software (such as is run on a general purpose computer system or a dedicated machine), or a combination of both.

Referring to FIG. 8, in processing block 802, process 800 begins by determining a first time range based on the expected inter-frame interval and a buffer delay associated with the jitter buffer. As noted above, in one embodiment, the expected inter-frame interval for VoIP is 20 milliseconds. In one embodiment, the buffer delay associated with jitter buffers for VoIP is 30 milliseconds. Thus, in this example, the time range has a duration of 60 milliseconds (i.e., 2×30 milliseconds). Expected times according to the expected inter-frame interval, t(n), are used to determine the portion of time that is examined in the time range, where t(n)=t(0)+20*n. The start of time range n is at t(n)−30 milliseconds and the end of the time range is at t(n)+30 milliseconds. Thus, total duration of the time range is 60 milliseconds.

In processing block 803, the arrival time of the first wireless frame in the set is examined to determine if the first wireless frame in the set arrived within the first time range. In the present example, with reference to FIG. 4, assume that the wireless frame labeled "1" did arrive within the first time range.

With reference again to FIG. 8, in processing block 804, a next time range is determined. In the present exemplary embodiment, the first time range and the next time range have the same duration but have different start and end times. Additionally, in the present exemplary embodiment, portions of the first time range and the next time range can overlap. For example, assume the first time range has a duration of 60 milliseconds, which can correspond to an expected time t(0), where t(0)=t(0)+20*0, a start time of t(0)−30 milliseconds, and an end time of t(0)+30 milliseconds. Thus, the next time range also has a duration of 60 milliseconds. However, assume that the next time range has an expected time t(1), where t(1)=[t(0)+20*1] milliseconds, a start time of t(1)−30 milliseconds and an end time of t(1)+30 milliseconds. Thus, the first time range and the next time range overlap for a portion of time (i.e., from t(0)+10 to t(0)+30 milliseconds).

In processing block 806, a determination is made as to whether the next wireless frame in the set has an arrival time within the next time range. In the present example, with reference to FIG. 4, assume that the wireless frame labeled "2" is determined to have an arrival time within the next time range.

With reference again to FIG. 8, in processing block 808, a determination is made as to whether the previous wireless frame was lost. In the present example, with reference to FIG. 4, the previous wireless frame, which is the wireless frame labeled "1", was found. Thus, with reference again to FIG. 8, in processing block 812, the found-to-found counter is incremented by one. In the present example, the found-to-found counter now has a value of one.

As depicted in FIG. 8, processing block 804 is iterated and the next time range is determined. In the present example, the next time range has an expected time of t(2), where t(2)=[t(0)+20*2] milliseconds, a start time of t(2)−30 milliseconds, and an end time of t(2)+30 milliseconds.

In processing block 806, a determination is made as to whether the next wireless frame found in the set has an arrival time within the next time range. In the present example, with reference to FIG. 4, assume that the wireless frame labeled "6" is determined to not have an arrival time within the next time range.

With reference again to FIG. 8, in processing block 814, a determination is made as to whether the previous wireless frame was lost. In the present example, with reference to FIG. 4, the previous wireless frame, which is the wireless frame labeled "2", was found. Thus, with reference again to FIG. 8, in processing block 816, the found-to-lost counter is incremented by one. In the present example, the found-to-lost counter now has a value of one.

With reference again to FIG. 8, in iterating processing block 804, the next time range is determined. In the present example, the next time range has an expected time of t(3), where t(3)=[t(0)+20*3] milliseconds, a start time of t(3)−30 milliseconds, and an end time of t(0)+90 milliseconds.

In processing block 806, a determination is made as to whether the next wireless frame found in the set has an arrival time within the next time range. In the present example, with reference to FIG. 4, assume that the wireless frame labeled "6" is determined to not have an arrival time within the next time range.

With reference again to FIG. 8, in processing block 814, a determination is made as to whether the previous wireless frame was lost. In the present example, with reference to FIG. 4, the previous wireless frame, which is the wireless frame labeled "3", was lost. Thus, with reference again to FIG. 8, in processing block 818, the lost-to-lost counter is incremented by one. In the present example, the lost-to-lost counter now has a value of one.

In iterating processing block 804, the next time range is determined. In the present example, the next time range has an expected time of t(4), where t(4)=[t(0)+20*4] milliseconds, a start time of t(4)−30 milliseconds, and an end time of t(4)+30 milliseconds.

In processing block 806, a determination is made as to whether the next wireless frame found in the set has an arrival time within the next time range. In the present example, with reference to FIG. 4, assume that the wireless frame labeled "6" is determined to not have an arrival time within the next time range.

With reference again to FIG. 8, in processing block 814, a determination is made as to whether the previous wireless frame was lost. In the present example, with reference to FIG. 4, the previous wireless frame, which is the wireless frame labeled "4", is lost. Thus, with reference again to FIG. 8, in processing block 818, the lost-to-lost counter is incremented by one. In the present example, the lost-to-lost counter now has a value of two.

In iterating processing block 804, the next time range is determined. In the present example, the next time range has an expected time of t(5), where t(5)=[t(0)+20*5] milliseconds, a start time of t(5)−30 milliseconds, and an end time of t(5)+30 milliseconds.

In processing block 806, a determination is made as to whether the next wireless frame found in the set has an arrival time within the next time range. In the present example, with reference to FIG. 4, assume that the wireless frame labeled "6" is determined to have an arrival time within the next time range.

With reference again to FIG. 8, in processing block 808, a determination is made as to whether the previous wireless frame was lost. In the present example, with reference to FIG. 4, the previous wireless frame, which is the wireless frame labeled "5" was lost. Thus, with reference again to FIG. 8, in processing block 810, the lost-to-found counter is incremented by one. In the present example, the lost-to-found counter now has a value of one.

In iterating processing block 804, the next time range is determined. In the present example, the next time range has an expected time of t(6), where t(6)=[t(0)+20*6] milliseconds, a start time of t(6)−30 milliseconds, and an end time of t(6)+30 milliseconds.

In processing block 806, a determination is made as to whether the next wireless frame found in the set has an arrival time within the next time range. In the present example, with reference to FIG. 4, assume that the wireless frame labeled "7" is determined to have an arrival time within the next time range.

With reference again to FIG. 8, in processing block 808, a determination is made as to whether the previous wireless frame was lost. In the present example, with reference to FIG. 4, the previous wireless frame, which is the wireless frame labeled "6", was found. Thus, with reference again to FIG. 8, in processing block 812, the found-to-found counter is incremented by one. In the present example, the found-to-found counter now has a value of two.

In iterating processing block 804, the next time range is determined. In the present example, the next time range has an expected time of t(7), where t(7)=[t(0)+20*7] milliseconds, a start time of t(7)−30 milliseconds, and an end time of t(7)+30 milliseconds.

In processing block 806, a determination is made as to whether the next wireless frame found in the set has an arrival time within the next time range. In the present example, with reference to FIG. 4, assume that the wireless frame labeled "8" is determined to not have an arrival time within the next time range.

With reference again to FIG. 8, in processing block 814, a determination is made as to whether the previous wireless frame was lost. In the present example, with reference to FIG. 4, the previous wireless frame, which is the wireless frame labeled "7", was found. Thus, with reference again to FIG. 8, in processing block 816, the found-to-lost counter is incremented by one. In the present example, the found-to-lost counter now has a value of two.

In iterating processing block 804, the next time range is determined. In the present example, the next time range has an expected time of t(8), where t(8)=[t(0)+20*8] milliseconds, a start time of t(8)−30 milliseconds, and an end time of t(8)+30 milliseconds.

In processing block 806, a determination is made as to whether the next wireless frame found in the set has an arrival time within the next time range. In the present example, with reference to FIG. 4, assume that the wireless frame labeled "9" is determined to have an arrival time within the next time range.

With reference again to FIG. 8, in processing block 808, a determination is made as to whether the previous wireless frame was lost. In the present example, with reference to FIG. 4, the previous wireless frame, which is the wireless frame labeled "8", was lost. Thus, with reference again to FIG. 8, in processing block 810, the lost-to-found counter is incremented by one. In the present example, the lost-to-found counter now has a value of two.

In iterating processing block 804, the next time range is determined. In the present example, the next time range has an expected time of t(9), where t(9)=[t(0)+20*9] milliseconds, a start time of t(9)−30 milliseconds, and an end time of t(9)+30 milliseconds.

In processing block 806, a determination is made as to whether the next wireless frame found in the set has an arrival time within the next time range. In the present example, with reference to FIG. 4, assume that the wireless frame labeled "10" is determined to have an arrival time within the next time range.

With reference again to FIG. 8, in processing block 808, a determination is made as to whether the previous wireless frame was lost. In the present example, with reference to FIG. 4, the previous wireless frame, which is the wireless frame labeled "9", was found. Thus, with reference again to FIG. 8, in processing block 812, the found-to-found counter is incremented by one. In the present example, the found-to-found counter now has a value of three.

As noted above, in the present exemplary embodiment, p is calculated by dividing the number of wireless frames in the found-to-lost state by the total number of wireless frames originating from the found state. Thus, in the present example, p is 0.4 (i.e., the value of the found-to-lost counter, which is two, divided by the total number of wireless frames originating from the found state, which is the sum of the found-to-found counter and the found-to-lost counter, which is 5).

As also noted above, in the present exemplary embodiment, q is calculated by dividing the number of wireless frames in the lost-to-found state by the total number of wireless frames originating from the lost state. Thus, in the present example, q is 0.5 (i.e., the value of the lost-to-found counter, which is two, divided by the total number of wireless frames originating from the loss state, which is the sum of the lost-to-lost counter and the lost-to-found counter, which is 4).

As also noted above, in the present exemplary embodiment, the burst rate is determined as 1/(p+q). Thus, in the present example, the burst rate is 1.11 (i.e., 1/(0.4+0.5))

B. Identifying Missing Wireless Frames Based on Sequence Numbers

Figure 9:
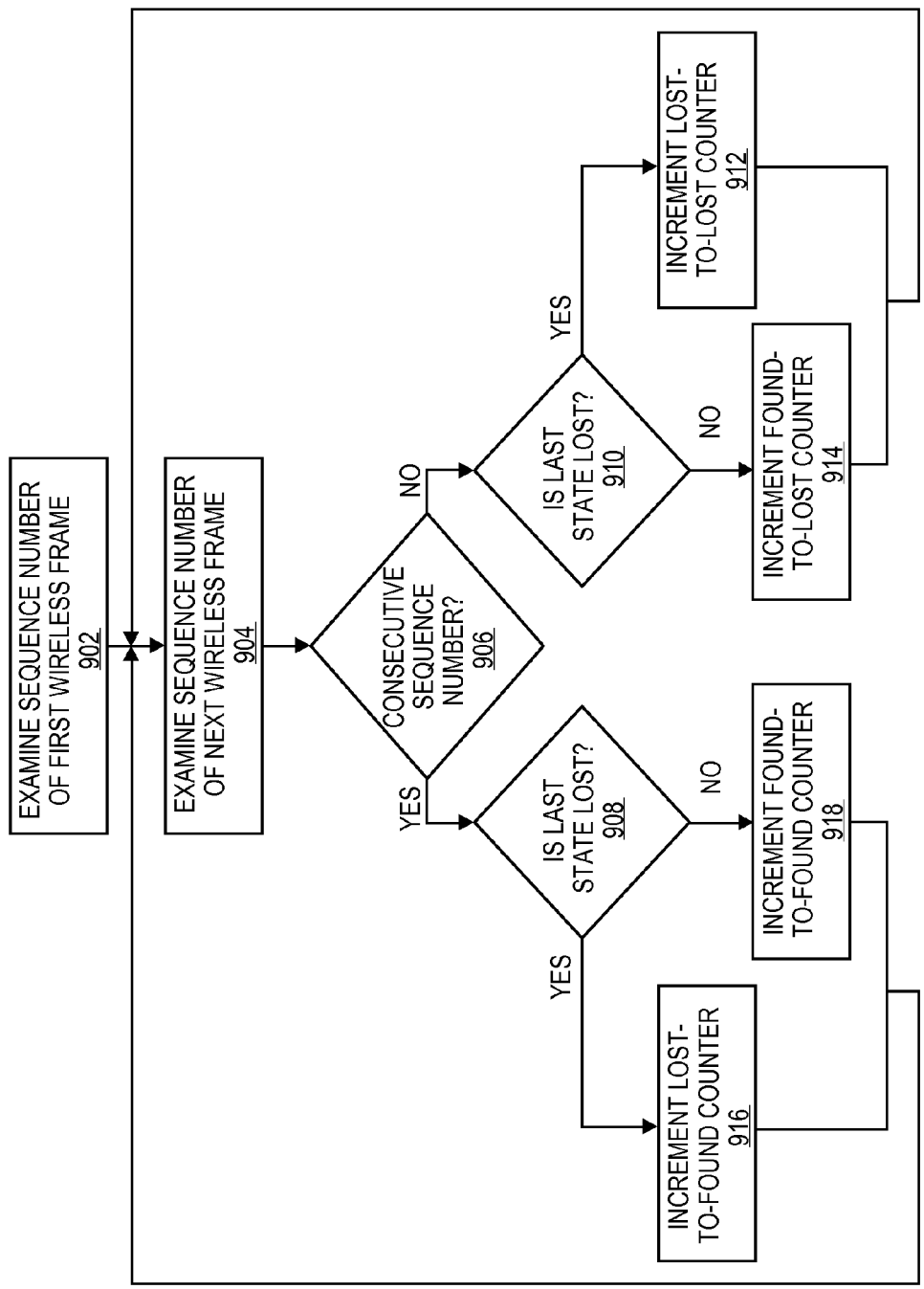
FIG. 9 depicts another exemplary process of determining burst rate.

With reference to FIG. 9, an exemplary process 900 is depicted of determining the burst rate by identifying missing wireless frames based on sequence numbers contained in the MAC header portions of the wireless frames. The process is performed by processing logic that may comprise hardware (circuitry, dedicated logic, etc.), software (such as is run on a general purpose computer system or a dedicated machine), or a combination of both.

Referring to FIG. 9, in processing block 902, process 900 begins by examining the sequence number of the first wireless frame in the set of wireless frames received by the detector. For example, with reference to FIG. 4, the sequence number of the wireless frame labeled "1" is examined.

With reference again to FIG. 9, in processing block 904, the sequence number of the next wireless frame in the set of wireless frames is examined. In the present example, with reference to FIG. 4, the sequence number of the wireless frame labeled "2" is examined.

With reference again to FIG. 9, in processing block 906, a determination is made as to whether the sequence number of the next wireless frame is the next consecutive sequence number to the previous wireless frame. Note that the previous wireless frame is the first wireless frame during the first iteration of process 900. In the present example, with reference to FIG. 4, the determination is made as to whether the sequence number of the wireless frame labeled "2" is the next consecutive sequence number to the wireless frame labeled "1".

With reference again to FIG. 9, if the sequence number of the wireless frame labeled "2" is the next consecutive sequence number to the wireless frame labeled "1", then the process transitions to processing block 908 where a determination is made as to whether the last state is lost. If the last state is lost, the process transitions to processing block 916 where a lost-to-found counter is incremented by one. If the last state is not lost, the process transitions to processing block 918, then a found-to-found counter is incremented by one. In the present example, with reference to FIG. 4, assume that the sequence number of the wireless frame labeled "2" is the next consecutive sequence number to the wireless frame labeled "1". Thus, the found-to-found counter is incremented by one. In the present example, the found-to-found counter now has a value of one.

After either of processing blocks 916 or 918, process 900 iterates to processing block 904 and the sequence number of the next wireless frame is examined. In the present example, with reference to FIG. 4, the sequence number of the wireless frame labeled "6" is examined.

With reference again to FIG. 9, in processing block 906, if the sequence number of the next wireless frame is not the next consecutive sequence number, the process transitions to processing block 910 where a determination is made as to whether the last state is lost. If the last state is lost, then the process transitions to processing block 912 where a lost-to-lost counter is incremented by the difference between the sequence numbers of the next wireless frame and the previous wireless frame minus two. If the last state is not lost, then the process transitions to processing block 914 where a found-to-lost counter is incremented by one.

Figure 4:
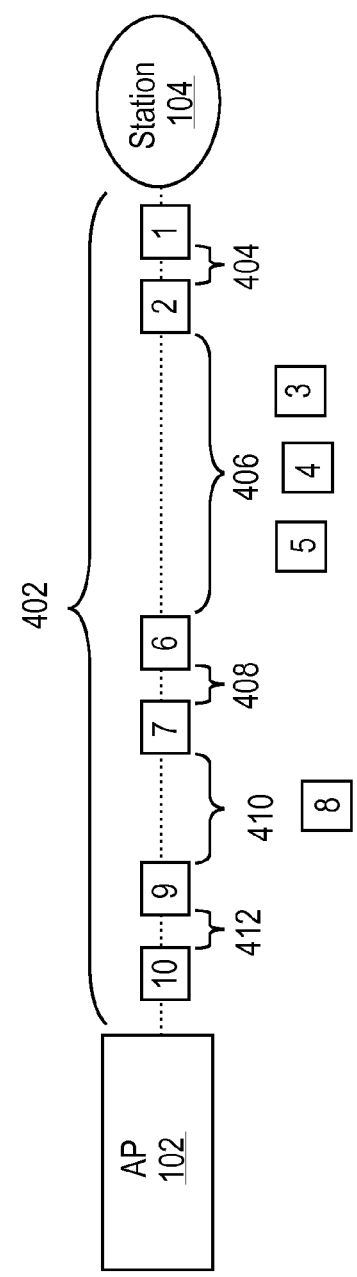
FIG. 4 depicts an exemplary set of wireless frames being transmitted between an AP and a station.

In the present example, with reference to FIG. 4, assume that the sequence number of the wireless frame labeled "6" is not the next consecutive number to the wireless frame labeled "2". Thus, the found-to-lost counter is incremented by one. In the present example, the found-to-lost counter now has a value of one. Assume also that difference between the sequence numbers of the wireless frame labeled "6" and the wireless frame labeled "2" is four. Thus, the lost-to-lost counter is incremented by two (i.e., four minus two). In the present example, the lost-to-lost counter now has a value of two. The lost-to-found counter is incremented by one. In the present example, the lost-to-found counter now has a value of one.

With reference again to FIG. 9, after either of processing blocks 912 and 914, process 900 iterates to processing block 904 and the sequence number of the next wireless frame is examined. In the present example, with reference to FIG. 4, the sequence number of the wireless frame labeled "7" is examined.

With reference again to FIG. 9, in the manner described above, process 900 is iterated until the last wireless frame in the set of wireless frames received by the detector is processed. In the present example, with reference to FIG. 4, process 900 (FIG. 9) is iterated until the wireless frame labeled "10" is processed.

In the present example, with reference to FIG. 4, assume that when the wireless frame labeled "7" is processed, the sequence number of the wireless frame labeled "7" is the next consecutive sequence number to the wireless frame labeled "6". Thus, the found-to-found counter is incremented by one. In the present example, the found-to-found counter now has a value of two.

As depicted in FIG. 4, in the present example, the sequence of the wireless frame labeled "9" is examined. Assume that the sequence number of the wireless frame labeled "9" is not the next consecutive number to the wireless frame labeled "7". Thus, the found-to-lost counter is incremented by one. In the present example, the found-to-lost counter now has a value of two. Assume also that difference between the sequence numbers of the wireless frame labeled "9" and the wireless frame labeled "7" is two. Thus, the lost-to-lost counter is incremented by zero (i.e., two minus two). In the present example, the lost-to-lost counter now has a value of two. The lost-to-found counter is incremented by one. In the present example, the lost-to-found counter now has a value of two.

As depicted in FIG. 4, in the present example, the sequence of the wireless frame labeled "10" is examined. Assume that the sequence number of the wireless frame labeled "10" is the next consecutive sequence number to the wireless frame labeled "9". Thus, the found-to-found counter is incremented by one. In the present example, the found-to-found counter now has a value of three.

As noted above, in the present exemplary embodiment, p is calculated by dividing the number of wireless frames in the found-to-lost state by the total number of wireless frames originating from the found state. Thus, in the present example, p is 0.4 (i.e., the value of the found-to-lost counter, which is two, divided by the total number of wireless frames originating from the found state, which is the sum of the found-to-found counter and the found-to-lost counter, which is 5).

As also noted above, in the present exemplary embodiment, q is calculated by dividing the number of wireless frames in the lost-to-found state by the total number of wireless frames. Thus, in the present example, q is 0.5 (i.e., the value of the lost-to-found counter, which is two, divided by the total number of wireless frames originating from the loss state, which is the sum of the lost-to-lost counter and the lost-to-found counter, which is 4).

As also noted above, in the present exemplary embodiment, the burst rate is determined as 1/(p+q). Thus, in the present example, the burst rate is 1.11 (i.e., 1/(0.4+0.5)).

3. Determining Jitter

Figure 10:
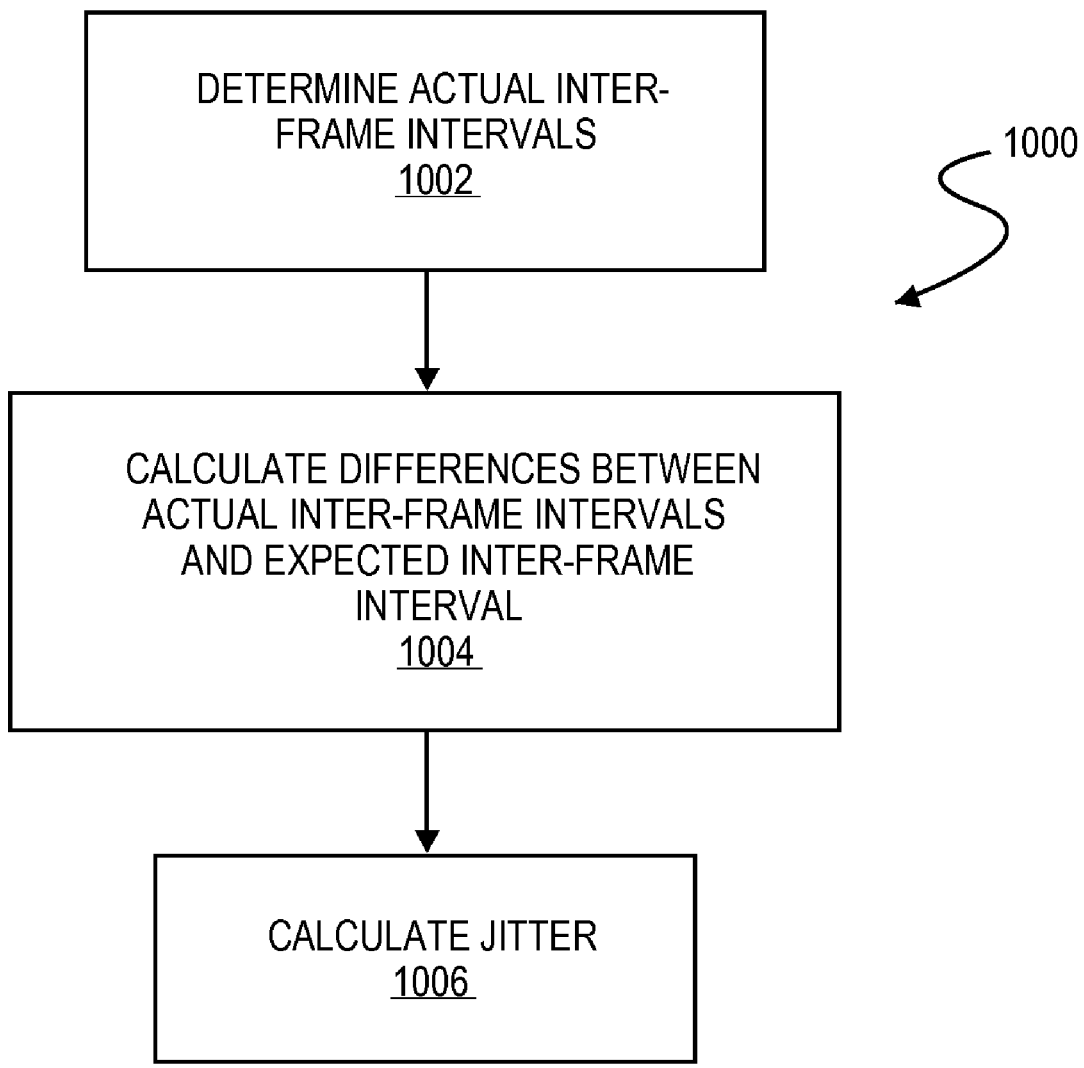
FIG. 10 depicts an exemplary process of determining jitter.

With reference to FIG. 10, an exemplary process 1000 is depicted for determining the jitter number. The process is performed by processing logic that may comprise hardware (circuitry, dedicated logic, etc.), software (such as is run on a general purpose computer system or a dedicated machine), or a combination of both.

In particular, in processing block 1002, the actual inter-frame intervals of the wireless frames in the set is determined from the arrival times of the wireless frames. For example, FIG. 4 depicts an actual inter-frame interval 404 between the wireless frames labeled "1" and "2" in a set of wireless frames 402. In the present exemplary embodiment, actual inter-frame interval 404 is determined as the different in arrival times of wireless frames labeled "1" and "2". FIG. 4 also depicts actual inter-frame interval 406, 408, 410, and 412 between wireless frames labeled "2" and "6", "6" and "7", "7" and "9", and "9" and "10", respectively, determined based on the arrival times of these wireless frames.

With reference again to FIG. 10, in processing block 1004, differences between the actual inter-frame intervals and the expected inter-frame interval are calculated for the wireless frames in the set. As noted above, the expected inter-frame interval for VoIP is currently 20 milliseconds. In the present example, with reference to FIG. 4, assume that actual inter-frame intervals 404, 406, 408, 410, and 412 are 20, 80, 20, 40, and 20 milliseconds, respectively. Thus, the differences between the actual inter-frame intervals and the expected inter-frame interval are 0, 60, 0, 20, and 0 milliseconds, respectively (i.e., 20-20, 80-20, 20-20, 40-20, and 20-20 milliseconds).

With reference again to FIG. 10, in processing block 1006, the jitter number is calculated as the average of the differences of the actual inter-frame intervals and the expected inter-frame interval. Thus, in the present example, the jitter number is 16 milliseconds (i.e., (0+60+0+20+0 milliseconds)/5 inter-frame intervals).

4. Determining the R-Value

In the present exemplary embodiment, the R-Value is determined based the determined loss rate, the determined burst rate, and the ITU standardized equation for R-Value, which is:

$$R = R_0 - I_s - I_d - I_{e\text{-}eff} + A.$$

In the above equation, the values of $R_0$, $I_s$, $I_d$ and A are determined using default values from the ITU-T (International Telecommunication Union) G.113, G.113-appendix I, and G.107. In the present example, assuming the codec as g.729A with packet size 20 ms, the values of $R_0$, $I_s$, $I_d$ and A are 95, −5.1, 0.15, and 0, respectively. The value of $I_{e\text{-}eff}$ is determined using the following equation:

$$I_{e\text{-}eff} = I_e + (95 - I_e) * \frac{Ppl}{\frac{Ppl}{BurstR} + Bpl},$$

where Equipment Impairment Factor, $I_e$, and Packet-loss Robustness Factor, Bpl, which are 11 and 19 respectively, are default values for given for the G.729A Codec in the ITU-T G.113 Appendix I. In the present example, plugging-in the values of determined loss rate, Ppl, of 40%, and the determined burst rate, BurstR, of 1.11 into the above equation, the value of $I_{e\text{-}eff}$ is 72. Thus, in the present example, the R-Value is 27.

5. Determining a Voice Quality Score

In the present exemplary embodiment, the determined R-Value can be mapped to a voice quality score, such as a MOS score, as depicted in FIG. 12. An R-Value is mapped to a MOS score with the following equation:

$$MOS = 1 + R*0.035 + R*(R-60)*(100-R)*7*10^{-6}$$

Thus, in the present example, where R-Value is 27, the corresponding MOS score is 1.5.

6. Correlating Voice Quality Scores with Signal Quality

In one exemplary embodiment, a plurality of rating values can be determined over a period of time. The plurality of rating values can be mapped to a plurality of voice quality scores, such as MOS scores, over the period of time. The voice quality scores over the period of time can then be displayed. One or more measured wireless-related functions (e.g., signal qualities, loss rate, signal strength, jitter, etc.) over the period of time can also be displayed in conjunction with the displayed voice quality scores. A user can then correlate the voice quality scores with the one or more measured signal qualities.

Figure 11A:
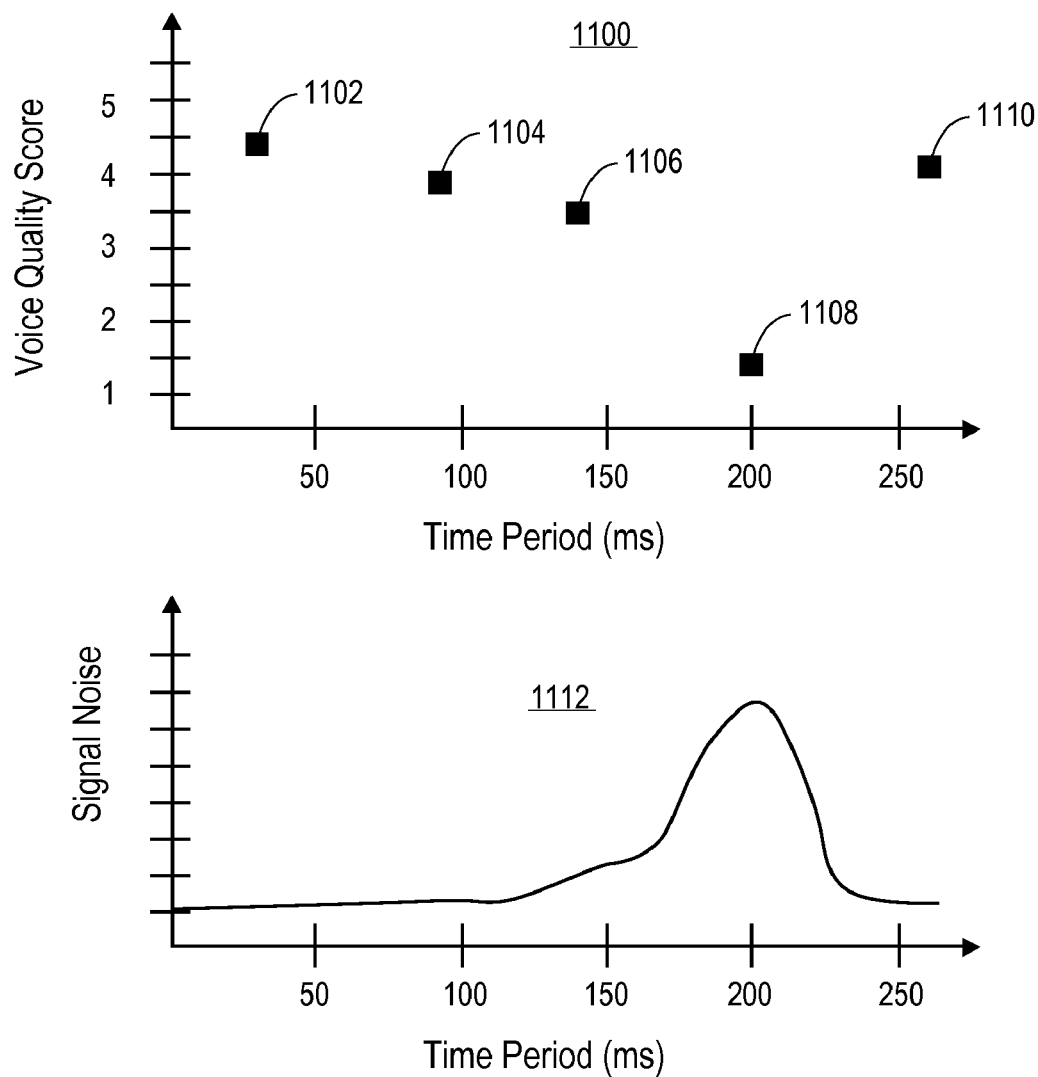
FIG. 11A depicts displays of voice quality over a period of time in conjunction with signal noise over the period of time.

For example, FIG. 11A depicts an exemplary graph 1100 of voice quality scores 1102, 1104, 1106, 1108, and 1110 over a period of time (in this example, over 250 milliseconds). Exemplary graph 1112 depicts signal noise during the same period of time. Based on graphs 1100 and 1112, a user can correlate the voice quality scores with the signal noise. It should be recognized that various signal qualities can be measured and displayed, such as network traffic, signal channel utilization, CRC errors, and the like. Although graphs 1100 and 1112 are depicted as separate graphs, it should be recognized that graphs 1100 and 1112 can be transposed on top of one another.

Figure 11B:
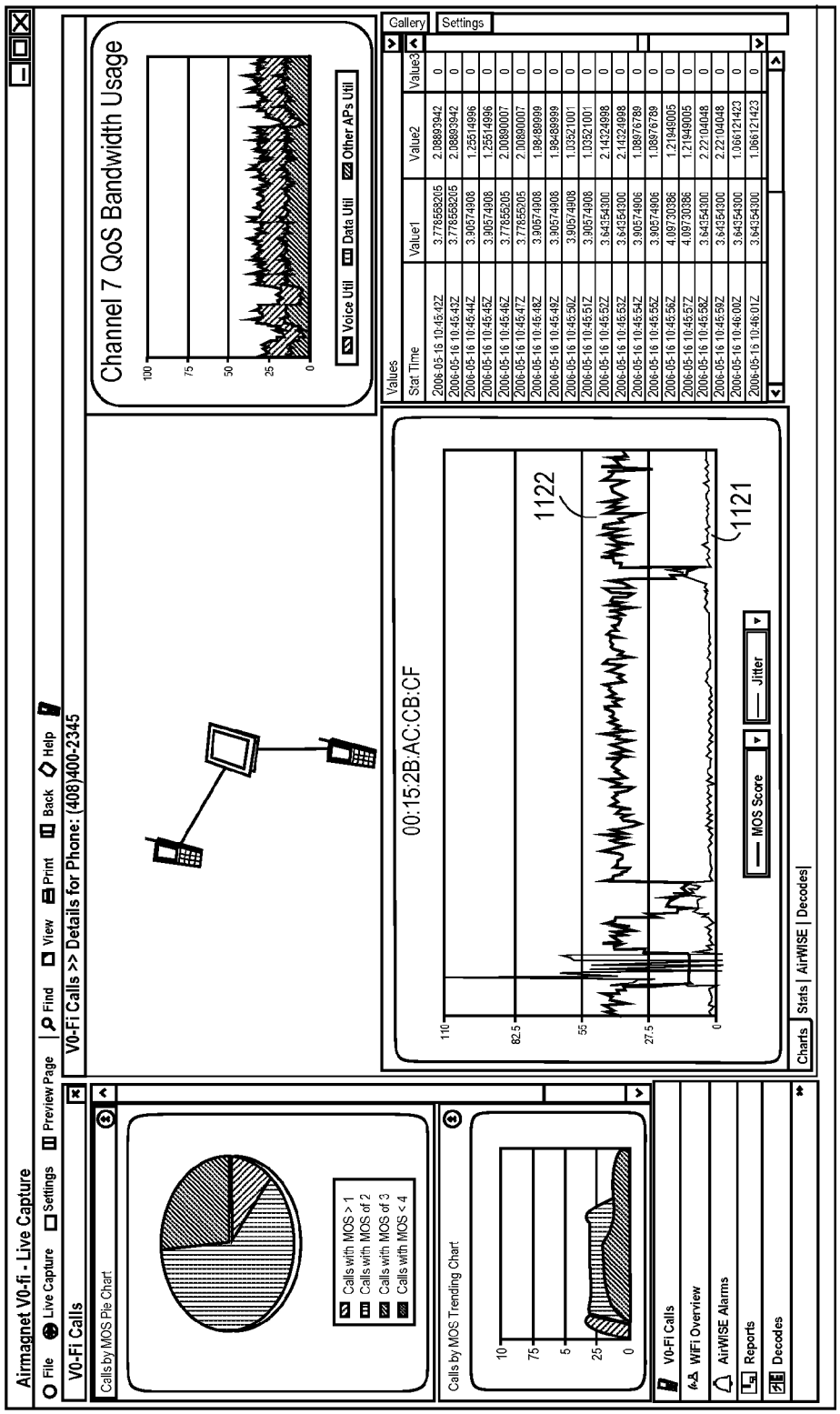
FIG. 11B-11D illustrated examples of graphs displaying voice quality and one other parameter.
Figure 11C:
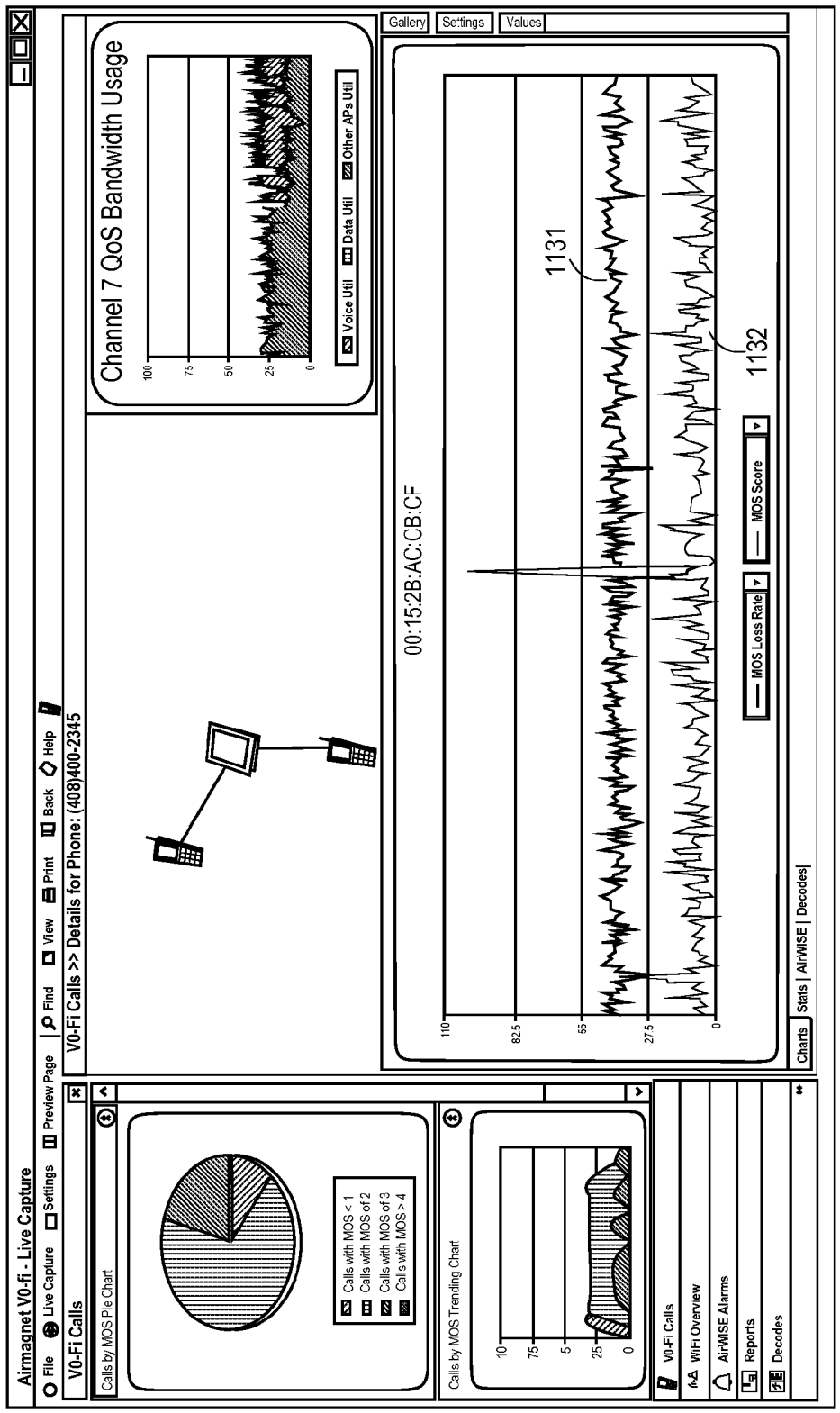
Figure 11D:
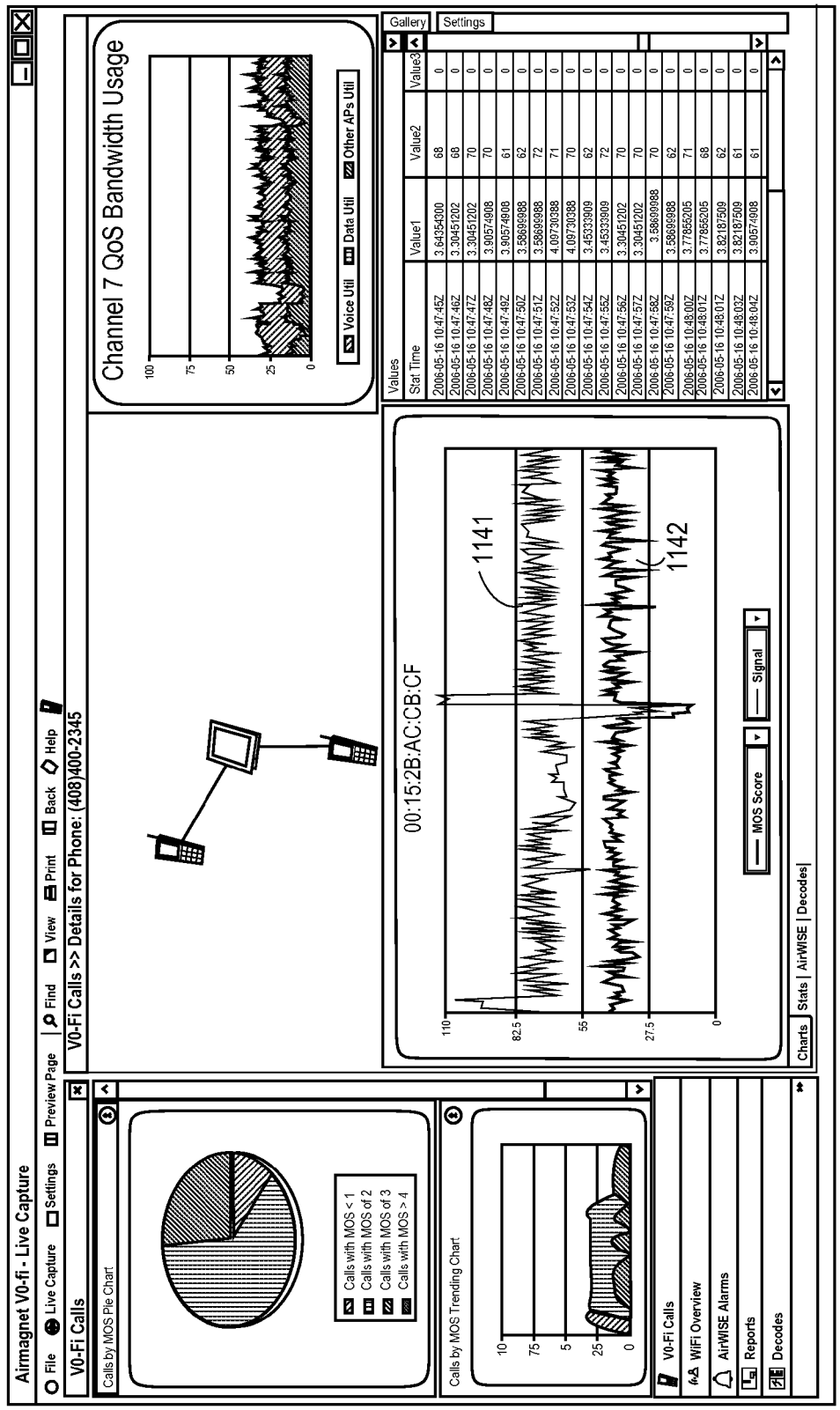

FIGS. 11B-11D illustrate examples of graphs being transposed upon each other. Referring to FIG. 11B, the MOS score graph 1122 is shown on the same graph as jitter. As illustrated, correlations between larger variations in each of the two graphs appear to correlate with another. That is, at times when the MOS score is lower, the jitter is shown to be much a higher than it typically is. FIG. 11C illustrates a graph of both the MOS loss rate with the MOS score. The MOS score graph 1131 has at least two larger variations which coincide with larger variations in the MOS loss rate graph 1132. FIG. 11D illustrates a graph of the signal noise along with the MOS score. Referring to FIG. 11D, some large variation in the signal noise graph 1141 are shown to coincide with a larger variation, at least once, in the MOS score graph 1142.

Thus, these screen captures may be used to illustrate correlations in the voice quality score (MOS) and other parameters such as, for example, jitter, loss rate signal strength, in that the MOS score changes when there are variable changes in some of the other score. Being able to associate the MOS with other parameters like loss rate signal may be used to identify a particular problem. That is, by visualizing parameters in the relationships to the MOS score, a determination may be made as the root cause of the problem, simply by examining the graph.

7. IP-PBX

As depicted in FIG. 2, AP 102 can be connected to an Intranet Private Branch eXchange (IP-PBX) 214. As is well known, IP-PBX 214 is configured to perform the functions of a Private Branch eXchange (PBX) in VoIP. For example, IP-PBX 214 switches and connects VoIP calls. It should be recognized that IP-PBX 214 can be implemented as software running on a server.

In one exemplary embodiment, call information associated with the set of wireless frames received by the detector can be obtained and used to improve the accuracy of the voice quality score or for troubleshooting. For example, IP-PBX 214 can be used to obtain and track call information from the MAC address such as user information, IP addresses, dialed phone number, reason for call termination, etc. The detector 206 can access the IP-PBX 214 to retrieve the MAC address and Call Detail Record (CDR). The CDR retrieved from IP-PBX 214 allows for further diagnosis of the wireless VoIP network in conjunction with the voice quality scores. By identifying the MAC address of a call at the detector 206, a wireless station 104 can be determined to be a phone.

In one exemplary embodiment, call information between the set of wireless frames (i.e., the wireless detected call) and IP-PBX 214 can be tracked by correlating the wireless MAC address of the wireless phone and the time of call. Using the MAC address, the phone number, IP address, and user name can be derived from IP-PBX 214. The combination of the MAC address and call time can be used to retrieve additional information for a particular call. For example, the Call Detail Record (CDR) can also be retrieved from IP-PBX 214 using the same MAC address and call-time combination to further assist wireless call quality diagnosis.

In one exemplary embodiment, detector 206 can include a mechanism to auto-detect a wireless phone (as opposed to a wireless laptop station for example).

Figure 13:
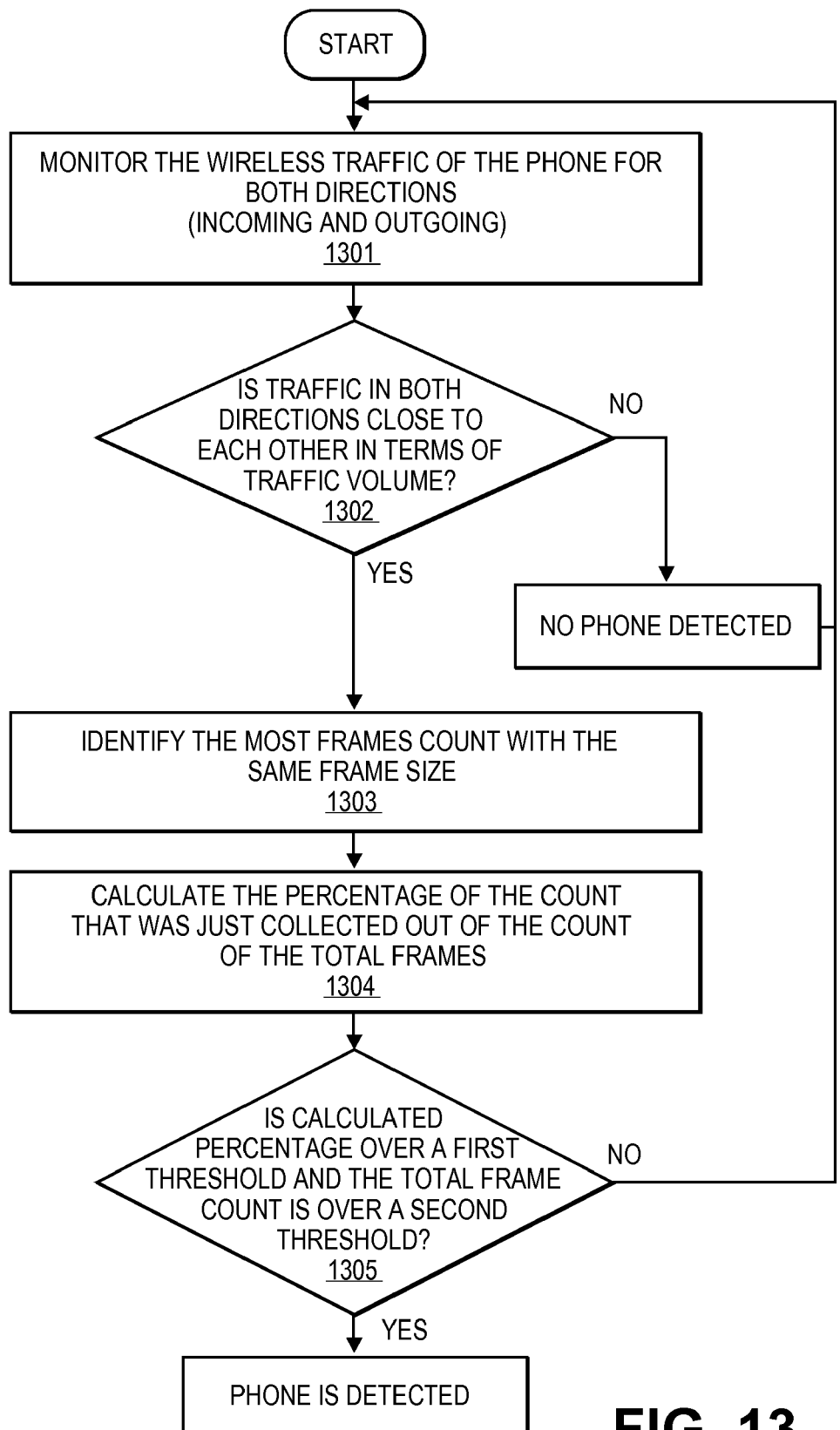
FIG. 13 is a flow diagram of one embodiment of a process for detecting a phone.

In one embodiment, a phone is detected based on the traffic pattern the phone has. FIG. 13 is a flow diagram of one embodiment of a process for detecting a phone. The process is performed by processing logic that may comprise hardware (circuitry, dedicated logic, etc.), software (such as is run on a general purpose computer system or a dedicated machine), or a combination of both.

Referring to FIG. 13 the process begins by processing logic monitoring the wireless traffic of the phone for both directions (incoming and outgoing) (processing block 1301). Processing logic tests whether the traffic in both directions are close to each other in term of traffic volume (processing block 1302). In one embodiment, if the ratio between two direction traffic volume is less than 1:2, it is considered close enough. If so, the process transitions to processing block 1303. If not, the process ends with a determination that no phone was detected.

At processing block 1303, after determining that the traffic in both directions is close, processing logic identifies the most frames count with the same frame size. For instance, if 10 frames of size 100 are received, 30 frames of size 154 are received, and 10 frames of size 40 are received, then the most frames count with same frame size is 30.

Afterwards, processing block calculates the percentage of the count that was just collected out of the count of the total frames (processing block 1304). In the above example, this calculation is as follows:

$$30/(10+30+10)=60\%.$$

Processing logic then tests whether the calculated percentage is over a first threshold and the total frames count is over a second threshold (processing block 1305). If so, processing logic identifies the station as a phone; if either condition is not met, processing logic concludes that the station is not a phone. In one embodiment, the first threshold is 90% and the second threshold is 50 for both directions. However, if the total frames count is 50, which is more than 40, but the calculated percentage 60% is less than 80%, processing logic would conclude the station is not a phone. Note that the thresholds may vary depending on the end stations, components and wireless environment.

In another exemplary embodiment, IP-PBX 214 can be used to more precisely identify a wireless phone by its MAC address. In particular, IP-PBX 214 can identify the MAC addresses of all phone calls. If these MAC addresses are picked up by detector 206, the calls can then be definitively identified as being from phones.

8. Call Detection

Figure 14:
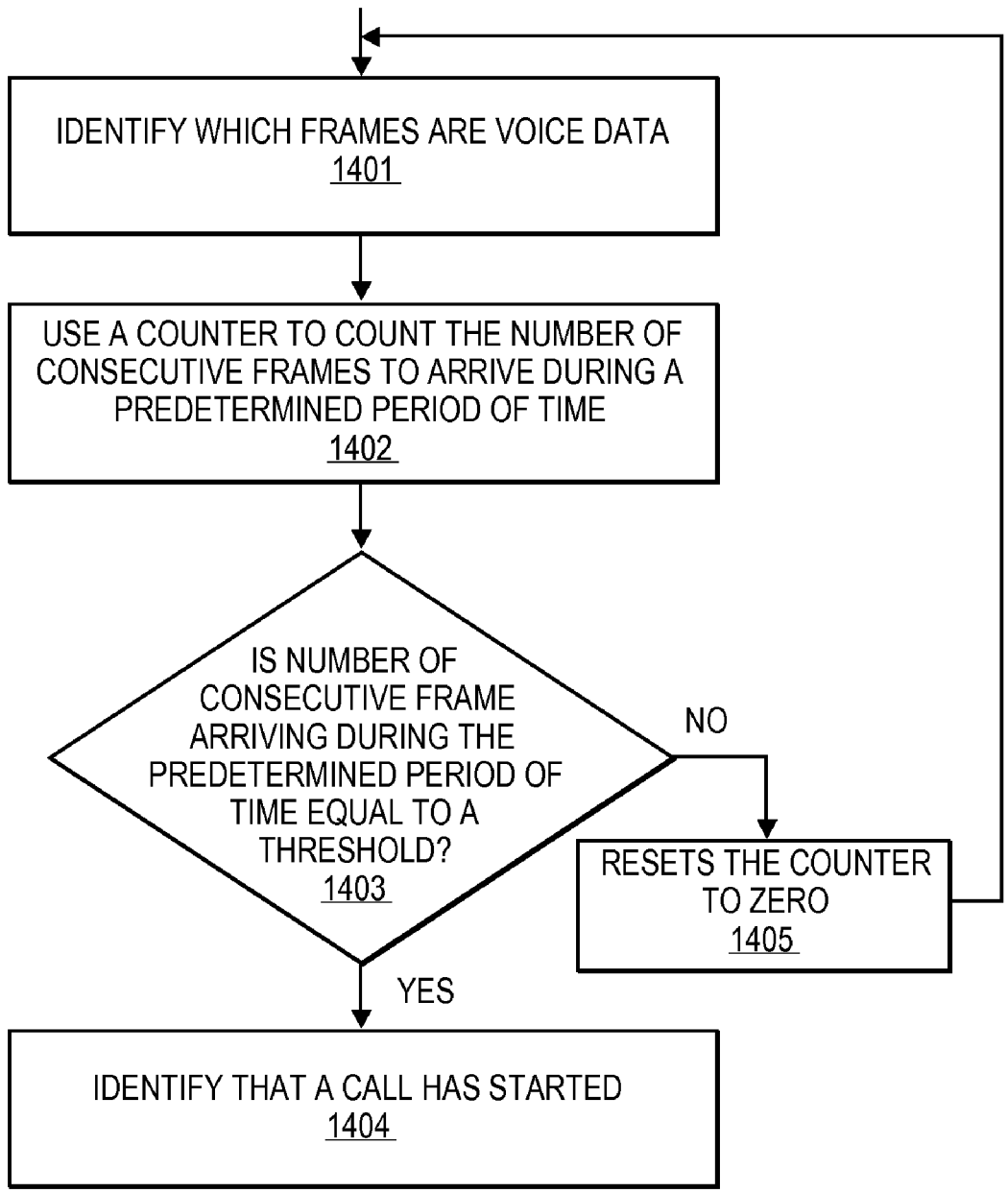
FIG. 14 is a flow diagram of one embodiment of a call detection process.

In one embodiment, a call detection process is performed. FIG. 14 is a flow diagram of one embodiment of a call detection process. The process is performed by processing logic that may comprise hardware (circuitry, dedicated logic, etc.), software (such as is run on a general purpose computer system or a dedicated machine), or a combination of both.

Referring to FIG. 14, the process begins, after detecting a phone, with processing logic identifying which frames are voice data (processing block 1401). Note that although the process of FIG. 14 is described in terms of voice data, in other embodiments, other types of data may be analyzed to facilitate the call detection process.

After identifying which frames are voice data, processing logic uses a counter to count the number of consecutive frames to arrive during a predetermined period of time (processing block 1402). The predetermined period of time is based on the expected frame duration between each voice data frame. The expected frame duration between each voice data frame is fixed. For example, in one embodiment, the expected frame duration between each voice data frame is 20 ms. In such a case, voice data frames are expected to be received every 20 ms.

Processing logic tests whether the number of consecutive frames arriving during the predetermined period of time is equal to a threshold (processing block 1403). In one embodiment, the threshold is 10 frames. If it is, then processing logic identifies that a call has started (processing block 1404) and the process ends. If not, then processing logic resets the counter to zero (processing block 1405) and returns to processing block 1402 and the process is repeated.

Returning to the example above with the expected frame duration between each voice data frame being 20 ms, if voice data frames are received in every 20 ms for 10 consecutive frames, processing logic concludes that a call has started. On the other hand, if there is inconsistency of the voice data frames arriving at the expected time, processing logic resets the counter to 0, and repeats the counting process, thereby waiting until another 10 consecutive frames arrive at the correct time slot to be considered a start of a new call.

9. Smart Scan

Many wireless client cards can only scan one channel at a time and there are numerous channels to scan. This can cause information in some channels to be missed so that a complete set of data is not received. To compensate for this problem, in one embodiment, an initial, short scan (less than full) is performed to quickly obtain data from channels of interest. In one embodiment, all the channels are scanned for a short period of time. In another embodiment, only a subset of all the channels are scanned. For example, the subset of channels may be selected based on media type. In such a case, the subset of channels may consist of all the A channels or all the BG channels. Other subsets of channels include the extended channels and the 4.9 GHz channel. The scan time is shorter than the normal scan time (e.g., 0.5 seconds, 0.25 seconds, most likely we will use 0.25 second). In one embodiment, the short scan time is variable and may be changed dynamically for each new scan of the channels based on one or more factors such as, for example, the number of channels being scanned, the AP state, the traffic volume, or wireless environment After collecting the data from the short scan, the data is examined and a decision is made as to which channel(s) to examine further. That is, a determination is made as to the number of channels to scan further. In one embodiment, a determination is also made as to how long to focus on each of this set of channels.

The selection of channels from the group that was subject to the short scan may be based on a variety of one or more factors. These factors may include channel utilization. For example, those channels that are most heavily used are selected for further scanning. Another factor may include the number of APs and/or end stations that are involved in the scan. This may even include end stations that are not actually in use at the time of the scan. Other factors include the number of current connections of a particular type (e.g., active voice activity in each channel) and the number of alarms. In one embodiment, the user determines the number to select in the scan that occurs after the initial, short scan.

In one embodiment, the process of performing a short scan on a set of channels, analyzing the data collected from the scan, performing a full or longer scan on a subset of the set of channels based on analysis of the data, and then analyzing the data resulting from the full or longer scan is repeated. In one embodiment, the process is repeated at regular intervals. In another embodiment, the process is repeated if the factors upon which the selection of the subset is made are changed. In yet another embodiment, the process is repeated if the state of the factors upon which the selection of the subset is made have changed. For example, if channel utilization was used as a factor during selection of the subset of factors and there was a drop in utilization, then the process is repeated. As another example, if the number of APs was used as a factor during selection of the subset of factors and there was a change (e.g., a decrease or increase in the number of APs), then the process is repeated. Note that the fact that a change occurred in itself may trigger a repeat in the process; however, in alternative embodiments, a predetermined amount of change may be necessary before triggering a repeat of the process. The predetermined amount of change may be based on percentage (e.g., a preselected drop in utilization rate) or actual number (e.g., a preselected amount of drop in utilization rate). For example, in the case where channel utilization was used as a factor during selection of the subset of factors, a drop in utilization may not trigger a repeat of the process unless the utilization drops a predetermined amount (e.g., by percentage, in the aggregate, etc.).

Figure 15:
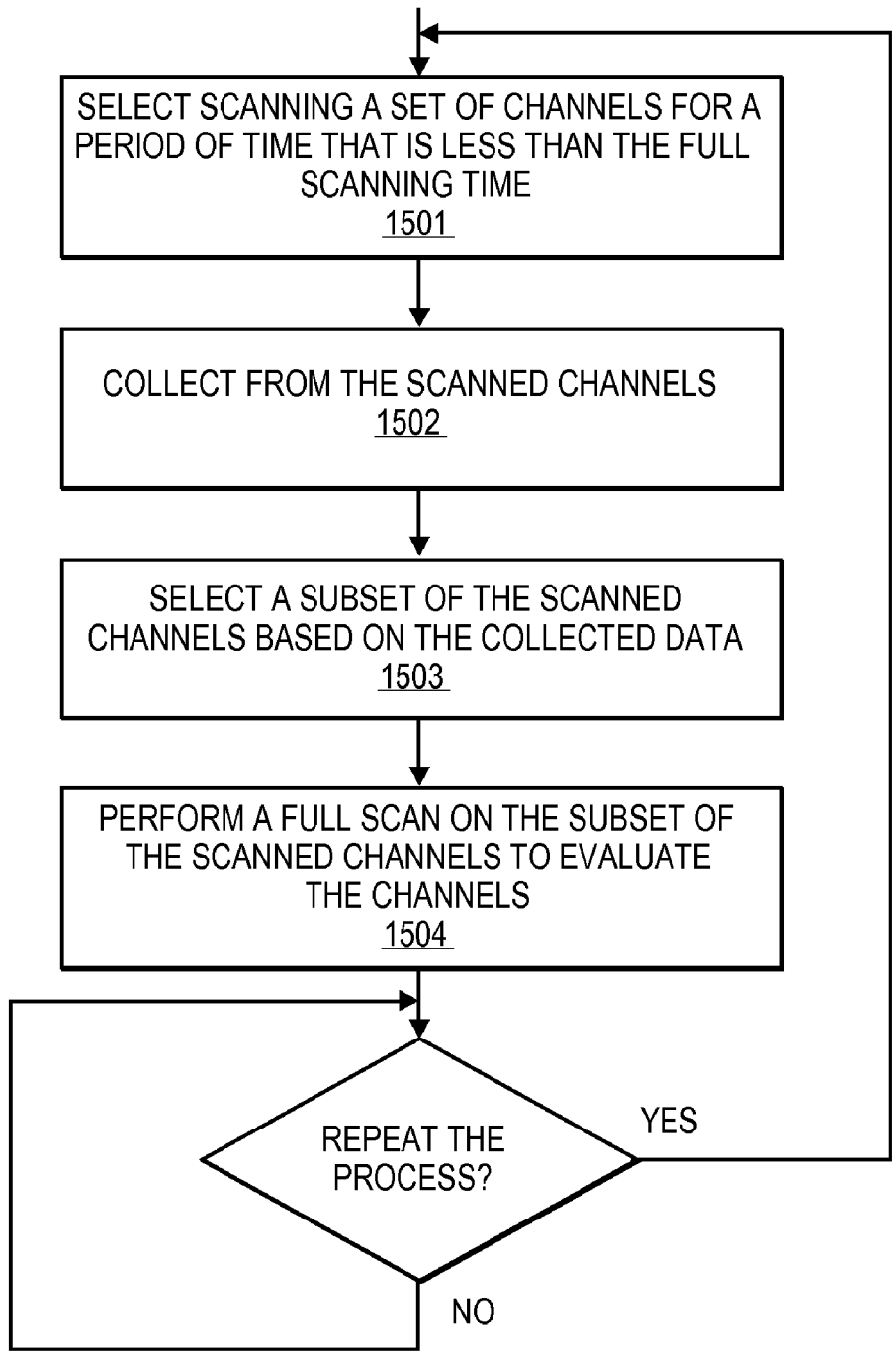
FIG. 15 is a flow diagram of one embodiment of a scanning process.

FIG. 15 is a flow diagram of the scanning process. Referring to FIG. 15, the process begins by scanning a set of channels for a period of time that is less than the full scanning time (1501). As discussed above, the set of channels may include all the channels or some subset of all the channels. Next, data from the scanned channels is collected (1502) and a subset of the scanned channels are selected based on the collected data (1503). This subset of the scanned channels is then subject to a full scan to evaluate the channels (1504). Subsequently, a determination is made to repeat the process (1505). If so, the process transitions to processing to 1501.

Although the present invention has been described with respect to certain exemplary embodiments, examples, and applications, it will be apparent to those skilled in the art that various modifications and changes may be made without departing from the invention.

We claim:

1. A method comprising:
monitoring wirelessly transmitted traffic between first and second stations;
determining whether the traffic sent in both directions between the first and second stations are close to each other in term of traffic volume;
identifying a total frames count of a number of frames of an identical frame size transmitted, where the number of frames is greater than any number of frames of a same size;
calculating the percentage of the count that was just collected out of the count of the total frames; and
identifying the first station as a phone if the calculated percentage is over a first threshold and the total frames count is over a second threshold.

2. The method of claim 1 further comprising determining that the first station is not a phone if either the calculated percentage is not over the first threshold or the total frames count is not over the second threshold.

3. The method of claim 1 further comprising:
identifying which frames of wirelessly transmitted traffic are voice data;
counting a number of consecutive frames to arrive during a predetermined period of time;
determining whether the number of consecutive frames arriving during the predetermined period of time is equal to a threshold; and
identifying a call has started if the number of consecutive frames arriving during the predetermined period of time is equal to the threshold.

4. The method of claim 3 wherein the predetermined period of time is based on expected frame duration between each voice data frame.

5. The method of claim 4 wherein the expected frame duration between each voice data frame is fixed.

6. The method of claim 3 further comprising:
resetting the count of consecutive frames to zero if the number of consecutive frames arriving during the predetermined period of time is not equal to the threshold.

7. The method of claim 1 wherein the traffic sent in both directions between the first and second stations are close to each other in term of traffic volume if a ratio between two traffic volumes is less than 1:2.

8. A detector to auto-detect a wireless station in a wireless network, the detector comprising:
an antenna configured to receive a set of wireless frames transmitted between a first wireless station and a second wireless station in the wireless network in a predetermined time period; and processor coupled to the antenna, the processor is configured to monitor wirelessly transmitted traffic between the first and second stations; to determine whether the traffic sent in both directions between the first and second stations are close to each other in term of traffic volume; to identify a total frames count of a number of frames of an identical frame size transmitted, where the number of frames is greater than any number of frames of a same size; to calculate the percentage of the count that was just collected out of the count of the total frames; and to identify the first station as a phone if the calculated percentage is over a first threshold and the total frames count is over a second threshold.

9. The detector of claim 8 wherein the processor is further configured to determine that the first station is not a phone if either the calculated percentage is not over a first threshold or the total frames count is not over a second threshold.

10. The detector of claim 8 wherein the processor is further configured to identify which frames of wirelessly transmitted traffic are voice data; to count a number of consecutive frames to arrive during a predetermined period of time; to determine whether the number of consecutive frames arriving during the predetermined period of time is equal to a threshold; and to identify a call has started if the number of consecutive frames arriving during the predetermined period of time is equal to the threshold.

11. The detector of claim 10 wherein the predetermined period of time is based on expected frame duration between each voice data frame.

12. The detector of claim 11 wherein the expected frame duration between each voice data frame is fixed.

13. A method comprising:
(a) scanning, by a processor, each of a first set of channels for a first period of time that is less than a second period of scanning time, where the second period of time is a time necessary to completely scan each channel;
(b) collecting data from the first set of scanned channels;
(c) selecting a subset of the scanned channels based on one or more factors of a first set of factors determined according to the collected data; and
(d) scanning each channel in the subset of channels for the second period of time to evaluate channels in the subset of channels.

14. The method of claim 13 further comprising repeating (a)-(d) if a change has occurred in the first set of factors.

15. The method of claim 13 further comprising repeating (a)-(d) at regularly scheduled times.

16. The method of claim 13, wherein the first set of factors comprise channel utilization, a number of access points or end stations that are involved with the scan, a number of current connections of a particular type, and a number of alarms.

17. The method of claim 13, wherein the first period of time is variable and changed dynamically for each new scan of the set of channels based on one or more factors of a second set of factors.

18. The method of claim 17, wherein the second set of factors comprise a number of channels being scanned, an access point state, a traffic volume, and a wireless environment.

19. The method of claim 13, wherein the first set of channels comprise all channels.

20. The method of claim 13, wherein the first set of channels is a subset of a second set of channels with the second set of channels comprising all channels and the first set of channels is selected based on media type.

* * * * *